(12) United States Patent
Rivera et al.

(10) Patent No.: US 10,261,329 B2
(45) Date of Patent: Apr. 16, 2019

(54) FIBER COMBINER WITH INPUT PORT DUMP

(71) Applicant: nLIGHT, Inc., Vancouver, WA (US)

(72) Inventors: Chris A. Rivera, Portland, OR (US); Dahv A. V. Kliner, Portland, OR (US); Joseph Emery, Vancouver, WA (US)

(73) Assignee: nLIGHT, Inc., Vancouver, WA (US)

( * ) Notice: Subject to any disclaimer, the term of this patent is extended or adjusted under 35 U.S.C. 154(b) by 0 days.

(21) Appl. No.: 15/686,096

(22) Filed: Aug. 24, 2017

(65) Prior Publication Data

US 2018/0059425 A1 Mar. 1, 2018

Related U.S. Application Data

(60) Provisional application No. 62/380,235, filed on Aug. 26, 2016, provisional application No. 62/380,312, filed on Aug. 26, 2016.

(51) Int. Cl.

| G02B 6/26 | (2006.01) |
| G02B 27/10 | (2006.01) |
| G02B 6/28 | (2006.01) |
| G01M 11/00 | (2006.01) |
| G02B 6/14 | (2006.01) |
| G02B 6/245 | (2006.01) |
| G02B 6/255 | (2006.01) |

(Continued)

(52) U.S. Cl.
CPC ............ *G02B 27/10* (2013.01); *G01M 11/33* (2013.01); *G02B 6/14* (2013.01); *G02B 6/245* (2013.01); *G02B 6/2551* (2013.01); *G02B 6/2558* (2013.01); *G02B 6/2821* (2013.01); *G02B 6/4296* (2013.01); *G02B 6/02042* (2013.01); *G02B 6/04* (2013.01); *G02B 6/2773* (2013.01); *H01S 3/0407* (2013.01); *H01S 3/06783* (2013.01)

(58) Field of Classification Search
None
See application file for complete search history.

(56) References Cited

U.S. PATENT DOCUMENTS

| 8,537,871 B2 | 9/2013 | Saracco |
| 2006/0163998 A1* | 7/2006 | Tiberi ............... B82Y 20/00 313/477 R |

(Continued)

OTHER PUBLICATIONS

International Search Report and Written Opinion from International Application No. PCT/US2017/048497, dated Feb. 27, 2018, 20 pages.

(Continued)

*Primary Examiner* — Eric Wong
(74) *Attorney, Agent, or Firm* — Klarquist Sparkman, LLP

(57) ABSTRACT

An apparatus includes a plurality of input fibers including one or more signal fibers and one or more beam dump fibers, a signal combiner having an input end coupled to the plurality of input fibers so as to couple portions of one or more signal beams respectively propagating in one or more of the signal fibers to form a combiner beam, an output fiber coupled to an output end of the signal combiner so as to receive the combiner beam, and a beam dump coupled to at least one of the one or more beam dump fibers so as to receive a light beam propagating from the output fiber that is associated with the combiner beam.

34 Claims, 7 Drawing Sheets

(51) Int. Cl.
G02B 6/42 (2006.01)
G02B 6/02 (2006.01)
G02B 6/04 (2006.01)
G02B 6/27 (2006.01)
H01S 3/04 (2006.01)
H01S 3/067 (2006.01)

(56) References Cited

U.S. PATENT DOCUMENTS

| | | |
|---|---|---|
| 2011/0091155 A1* | 4/2011 | Yilmaz ............ G02B 6/4207 385/30 |
| 2012/0026749 A1 | 2/2012 | Armstrong |
| 2012/0045169 A1 | 2/2012 | Hu et al. |
| 2013/0087694 A1 | 4/2013 | Creeden et al. |
| 2014/0241385 A1 | 8/2014 | Fomin et al. |
| 2014/0270637 A1 | 9/2014 | Desbiens et al. |
| 2015/0043597 A1 | 2/2015 | Yusim et al. |
| 2015/0349481 A1 | 12/2015 | Kliner |
| 2017/0017036 A1* | 1/2017 | Botheroyd ............ G02B 6/2856 |

OTHER PUBLICATIONS

International Search Report and Written Opinion from International Application No. PCT/US2017/048500, dated Feb. 28, 2018, 21 pages.
Wetter et al., "High power cladding light strippers," Proc. of SPIE, 6873:687327-1-687327-8 (2008).

* cited by examiner

FIBER COMBINER WITH INPUT PORT DUMP

CROSS-REFERENCE TO RELATED APPLICATIONS

This application claims the benefit of U.S. Provisional Patent Application No. 62/380,235, filed Aug. 26, 2016, and U.S. Provisional Application No. 62/380,312, filed Aug. 26, 2016. Both applications are incorporated by reference herein in their entireties.

FIELD

The disclosure pertains to fiber combiners and fiber laser systems.

BACKGROUND

High power laser systems typically use a signal combiner to combine multiple high power beams to produce a beam of additively higher power. The construction of the combiner typically provides a number of input ports based on a particular packing geometry. Each of the ports is typically used to propagate a high power beam in order to fill the available ports and to avoid possible deleterious effects associated with allowing ports to remain unused.

SUMMARY

According to one aspect of the disclosed technology, an apparatus includes a plurality of input fibers including one or more signal fibers and one or more beam dump fibers, a signal combiner having an input end coupled to the plurality of input fibers so as to couple portions of one or more signal beams respectively propagating in one or more of the signal fibers to form a combiner beam, an output fiber coupled to an output end of the signal combiner so as to receive the combiner beam, and a beam dump coupled to at least one of the one or more beam dump fibers so as to receive a light beam propagating from the output fiber that is associated with the combiner beam.

In some embodiments, the integrating beam dump includes a pair of substantially identical thermally conductive halves having respective interior faces angularly rotated relative to each other and joined so as to define an interior volume, each half including a curved interior surface situated to diffuse light propagating in the interior volume and a notch input situated to receive one of an output end of the at least one of the one or more beam dump fibers and a photodetector.

In further examples, apparatus include a beam dump half including an interior situated to diffuse, absorb, or otherwise dump light, and including an inlet extending from an exterior surface of the beam dump half to the interior so as to either receive light or so as to direct the received light to a photodetector, wherein the beam dump half is situated to receive a substantially identical other beam dump half so that the other inlet of the other beam dump half is situated so as to oppositely either direct the received light to a photodetector or to receive the light.

According to another aspect of the disclosed technology, a method includes coupling a plurality of input signal fibers to an input end of a signal combiner having a plurality of input ports situated to receive respective signal beams and to combine the signal beams to form a combiner output beam coupled to an output fiber coupled to an output end of the signal combiner, and coupling an output end of a separate fiber coupled to one of the input ports of the signal combiner to a beam dump situated to receive a light beam associated with the combiner output beam.

According to a further aspect of the disclosed technology, an apparatus includes a pair of substantially identical thermally conductive halves having respective interior faces angularly rotated relative to each other and joined so as to define an interior volume, each half including a curved interior surface situated to diffuse light propagating in the interior volume and a notch input extending from an exterior surface of the half to the interior volume so that the notch of one thermally conductive half is situated to receive an optical input and the notch of the other thermally conductive half is situated to receive a photodetector.

The foregoing and other features and advantages of the disclosed technology will become more apparent from the following detailed description, which proceeds with reference to the accompanying figures.

DETAILED DESCRIPTION

Figure 1:
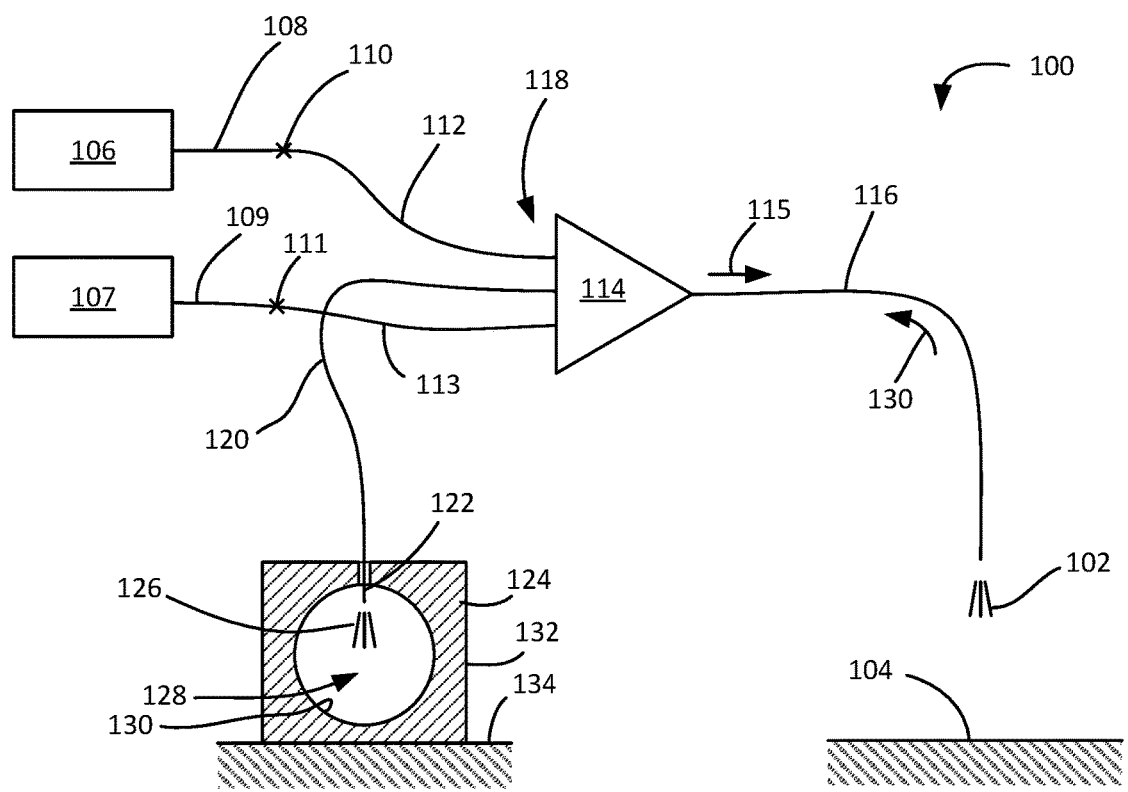
FIG. 1 is a schematic of an example laser system.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

As used herein, optical radiation refers to electromagnetic radiation at wavelengths of between about 100 nm and 10 μm, and typically between about 500 nm and 2 μm. Examples based on available laser diode sources and optical fibers generally are associated with wavelengths of between about 800 nm and 1700 nm. In some examples, propagating optical radiation is referred to as one or more beams having diameters, asymmetric fast and slow axes, beam cross-sectional areas, and beam divergences that can depend on beam wavelength and the optical systems used for beam shaping. For convenience, optical radiation is referred to as light in some examples, and need not be at visible wavelengths.

Representative embodiments are described with reference to optical fibers, but other types of optical waveguides can be used having square, rectangular, polygonal, oval, elliptical or other cross-sections. Optical fibers are typically formed of silica (glass) that is doped (or undoped) so as to provide predetermined refractive indices or refractive index differences. In some, examples, fibers or other waveguides are made of other materials such as fluorozirconates, fluoroaluminates, fluoride or phosphate glasses, chalcogenide glasses, or crystalline materials such as sapphire, depending on wavelengths of interest. Refractive indices of silica and fluoride glasses are typically about 1.5, but refractive indices of other materials such as chalcogenides can be 3 or more. In still other examples, optical fibers can be formed in part of plastics. In typical examples, a doped waveguide core such as a fiber core provides optical gain in response to pumping, and core and claddings are approximately concentric. In other examples, one or more of the core and claddings are decentered, and in some examples, core and cladding orientation and/or displacement vary along a waveguide length.

In the examples disclosed herein, a waveguide core such as an optical fiber core is doped with a rare earth element such as Nd, Yb, Ho, Er, or other active dopants or combinations thereof. Such actively doped cores can provide optical gain in response to optical or other pumping. As disclosed below, waveguides having such active dopants can be used to form optical amplifiers, or, if provided with suitable optical feedback such as reflective layers, mirrors, Bragg gratings, or other feedback mechanisms, such waveguides can generate laser emissions. Optical pump radiation can be arranged to co-propagate and/or counter-propagate in the waveguide with respect to a propagation direction of an emitted laser beam or an amplified beam.

In FIG. 1, a laser system 100 is shown that produces a laser output beam 102 that is continuous-wave or quasi continuous-wave and that typically provides an average power of greater than 4 kW. The laser output beam 102 is directed to a target 104, such as a metallic surface, for precision laser cutting, welding, or other high power applications. The laser system 100 includes a laser signal sources 106, 107 situated to produce and couple signal beams into respective signal fibers 108, 109. For example, in the generation of a laser output beam 102 of 6 kW, 3 kW signal beams propagate through each of the signal fibers 108, 109. The signal fibers 108, 109 are spliced at repetitive fiber splices 110, 111 to signal combiner inputs fibers 112, 113 of a signal combiner 114. The signal combiner 114 receives and combines the signal beams to form a combined signal beam 115 that is coupled into a combiner output fiber 116. The combiner output fiber 116 emits the combined signal beam 115 as the laser output beam 102. In some embodiments, one or more additional output fibers, such as a delivery fiber, are coupled to the combiner output fiber 116 to deliver the laser output beam 102 to a laser head situated to direct the laser output beam 102 in relation to the target 104.

The signal combiner input fibers 112, 113 are coupled to an input end 118 of the signal combiner 114 along with a separate input fiber 120 that is not coupled to a laser signal source 106. In representative examples, the separate input fiber 120 corresponds to a fiber that could otherwise be used as a signal combiner input fiber and be coupled to an additional or replacement laser signal source. An input end 122 of the separate input fiber 120 is coupled to an interior region of a beam dump 124. During operation of the laser system 100, a separate beam 126 can be formed that is associated with the laser output beam 102 and that propagates in a reverse direction from the laser output beam 102. The beam dump 124 is situated to receive the separate beam 126 and to diffuse the separate beam 126 in an interior integrating volume 128 having one or more curved surfaces 130 so that the optical energy of the separate beam 126 is removed through a thermally conductive housing 132. In some examples, the separate beam 126 is diffused through multiple specular reflections or through diffusive reflections. In some examples, the beam dump 124 forms an enclosure that defines a cavity in which the separate beam 126 is absorbed. Thermal energy is directed away through an attached conductive housing 134, such as a water-cooled cooling block. In representative examples, 50 W or greater of continuous power is received as the separate beam 126.

In representative examples of the laser system 100, during active operation the laser output beam 102 can reflect at surface of the target 104 and cause a portion of the laser output beam 102 to be coupled back into the combiner output fiber 116 so as to form a backward propagating beam 130 that propagates in a direction opposite to that of the combined signal beam 115. The backward propagating beam 130 can propagate back through the signal combiner 114 to reach and potentially damage the signal sources 106, 107 or other components, such as the signal combiner 114. The combiner output fiber 116 or an associated delivery fiber can break or fail causing additional resonant cavities to form within the laser system 100, such as between the fiber break and one or more Bragg gratings associated with the signal sources 106, so as to produce the backward propagating beam 130. In some examples, the backward propagating beam 130 includes light at the wavelength at or near that of the signal sources 106, 107 and light at one or more Raman wavelengths that are associated with stimulated Raman scattering (SRS). The separate beam 126 includes at least a portion of the backward propagating beam 130 and the beam dump 124 is situated to remove at least some of the optical energy associated with the backward propagating beam 130. By directing the separate beam 126 to the beam dump, technicians repairing or performing maintenance on the laser system 100 can avoid injury from high power laser light reflecting within the interior of the housing of the laser system 100.

Figure 2:
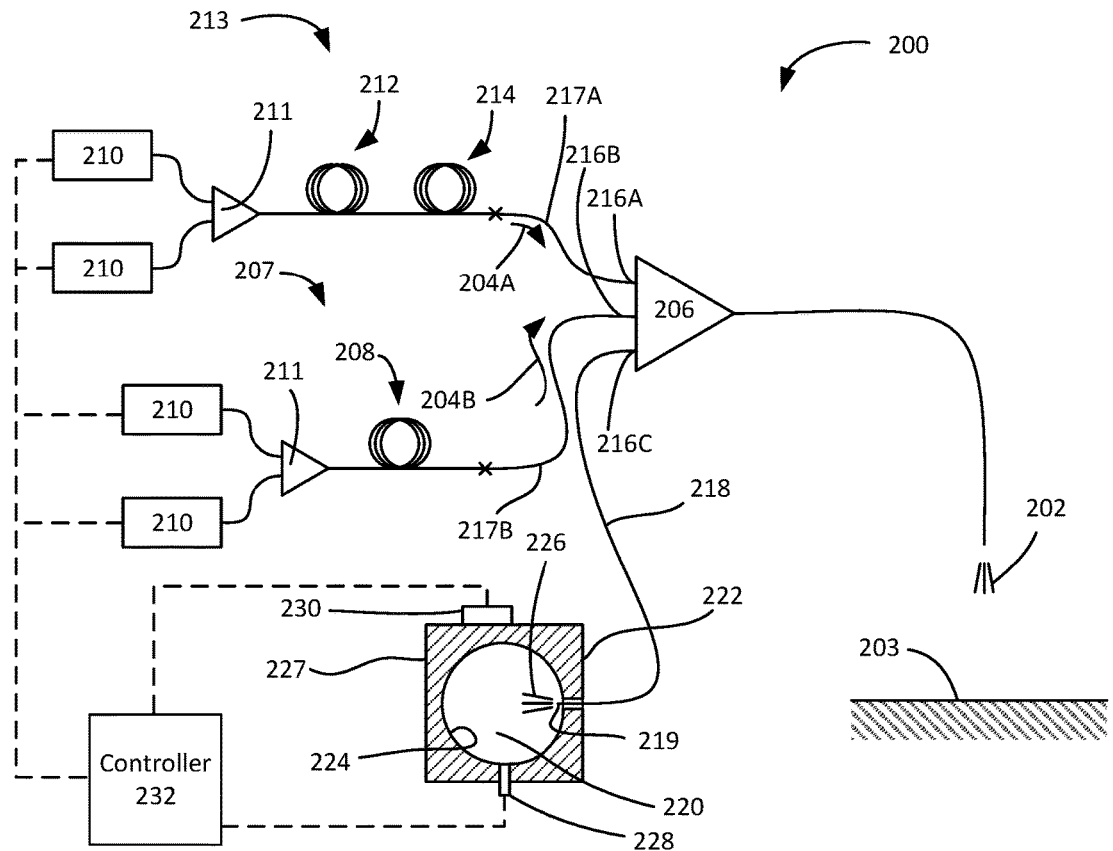
FIG. 2 is a schematic of another example laser system.

FIG. 2 shows another example of a laser system 200 that forms and delivers a laser output beam 202 to a target 203. The laser output beam 202 can be a high power beam, and in typical examples, has an average power of 1 to 100 kW. The laser beam 202 is produced by combining a plurality of signal beams 204A, 204B with a signal combiner 206. The signal beam 204B is produced with a fiber laser system 207 that includes an oscillator 208 coupled to and pumped by diode pump sources 210 combined with a pump or pump signal combiner 211. The signal beam 204A is produced with a fiber laser system 213 that includes a master oscillator 212 coupled to one or more fiber power amplifiers 214. The signal beams 204A, 204B are coupled to corresponding signal combiner inputs 216A, 216B of the signal combiner 206 through respective input fibers 217A, 217B spliced to the respective fiber laser systems 213, 207. A separate input 216C of the signal combiner 206 is coupled to a length of fiber 218 having an end 219 that is coupled to an interior volume 220 of a beam dump 222. The interior volume 220 is typically defined by one or more curved surfaces 224 that are suited for diffusing a reverse-propagating beam 226 associated with the laser output beam 202 that is directed into the interior volume 220 through the end 219 of the fiber 218. The beam dump 222 is situated to remove the reverse-propagating beam 226 from the laser system 200 by reflecting the reverse-propagating beam 226 multiple times in the interior volume 220 and absorbing the diffused beam with a conductive housing 227.

A photodetector 228, such as a photodiode, is coupled to the beam dump 222 and is in optical communication with the interior volume 220. The photodetector 228 is situated to detect one or more optical characteristics of the reverse-propagating beam 226, such as wavelength or power. A thermal sensor 230, such as a thermistor, is coupled to the conductive housing 227 of the beam dump 222 and is situated to detect a temperature variation of the conductive housing 227 that is associated with the power level and duration of the reverse-propagating beam 226. A controller 232 is situated to receive a signal from the photodetector 228 corresponding to the optical characteristics of the reverse-propagating beam 226 and a signal from the thermal sensor 230 corresponding to a temperature of the conductive housing 227. The controller 232 is further coupled to the diode pump sources 210 and is situated to change or disconnect power delivered to the diode pump sources 210 based on the detected characteristics of the reverse-propagating beam 226 and/or the conductive housing 227 so that the signal beams 204A, 204B can be deenergized. Thus, the beam dump 222 becomes a useful diagnostic tool to monitor and potentially disable one or more components of the laser system 200 based on the detection of selected characteristics of the reverse-propagating beam 226.

Figure 3A:
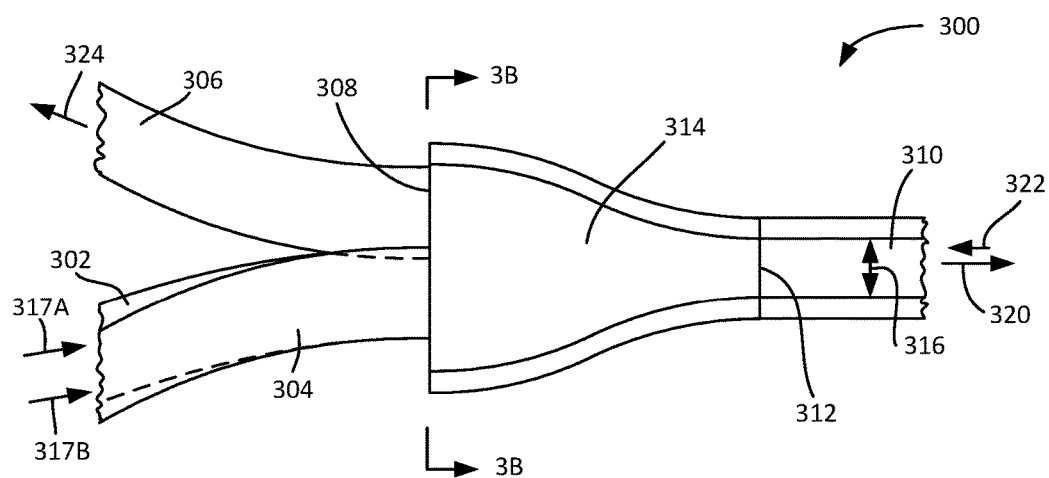
FIGS. 3A and 3B are a side view and end view, respectively, of an example signal combiner.
Figure 3B:
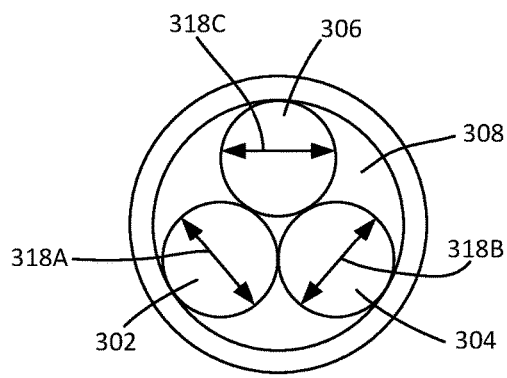

FIGS. 3A-3B show an example of a signal combiner 300 having three input fibers 302, 304, 306 coupled to a combiner input face 308. An output fiber 310 is coupled to a combiner output face 312. A central portion 314 extends and adiabatically tapers between the input and output faces 308, 312. In some examples, the three input fibers 302, 304, 306 are fused to the combiner input face 308. In further examples, the three input fibers 302, 304, 306 are fused and tapered together so as to form the central portion 314. In typical examples, a signal cross-section 316 of the output fiber 310 is the same or smaller than signal cross-sections 318A, 318B, 318C of the input fibers 302, 304, 306. In some examples, the input fibers 302, 304 are situated to propagate high power input beams 317A, 317B in the signal cross-sections 318A, 318B and to deliver the input beams 317A, 317B to the central portion 314 of the signal combiner 300 to become combined and coupled into the signal cross-section 316 of the output fiber 310 as an output beam 320 having an output power approximately equal to the sum of the input beams 317A, 317B. A separate beam 322 can form that propagates in the opposite direction as the output beam 320 and that can damage optical components, including the signal combiner 300 and optical components associated with the generation of the input beams 317A, 317B. The third fiber 306 can be situated so as to receive at least a portion 324 of the separate beam 322. Based on the optical characteristics of the received portion 324, the power levels of the input beams 317A, 317B can be reduced to reduce a probability of failure of the signal combiner 300 or other optical components. In various examples, combiner input fibers, such as the input fibers 302, 304, 306, and combiner output fibers, such as output fiber 310, can be single-mode, few-mode, or multi-mode.

Figure 4:
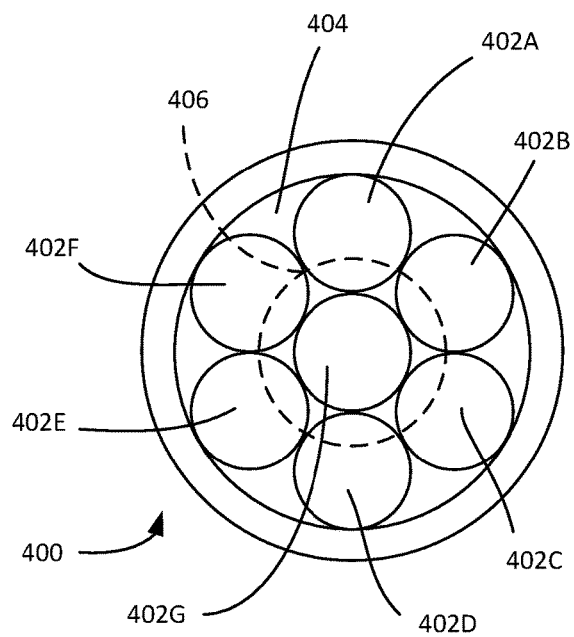
FIG. 4 is an end view of another example signal combiner.

FIG. 4 shows another example of a signal combiner 400 that includes a hexagonal arrangement of seven input fibers 402A-402G coupled to an input face 404. The input fibers 402A-402G are fused and tapered to form a combiner output 406 having a smaller diameter than the input face 404. In some examples, input fibers 402B, 402C, 402E, 402F are situated to receive and couple corresponding high power input signals into signal combiner 400 through the input face 404. For example, each high power input signal can have powers of 800 W, 1 kW, 1.5 kW, 2 kW, or greater. The input fibers 402A, 402D can be coupled together (e.g., with a splice) to form a fiber loop, providing the input fibers 402A, 402D as potential expansion or backup inputs to the signal combiner 400. The centrally situated input fiber 402G does not propagate an input signal and instead is used to detect reverse-propagating light received from the combiner output 406 so as protect laser sources coupled to the input fibers 402B, 402C, 402E, 402F during normal operation or during a failure event. The central position of the input fiber 402G can allow reverse propagating light propagating along a central path to become better coupled into the input fiber 402G so as to improve removal of the reverse propagating light. In further examples, one or more of the input fibers 402A-402F situated on the periphery can be used to detect or remove reverse propagating light. In further examples, 2:1, 4:1, 5:1, 3:2, and other ratios of combiner inputs to combiner outputs can be used.

Figure 5A:
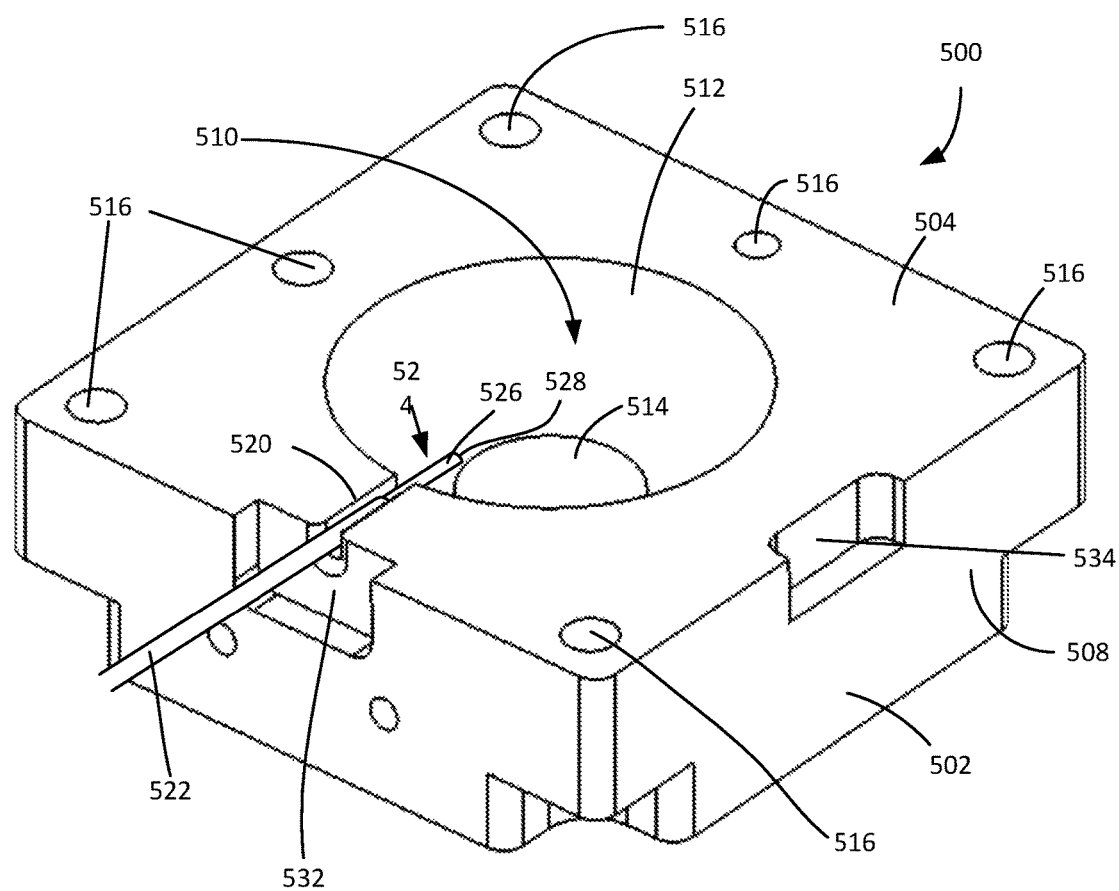
FIG. 5A is a perspective view of a first half of an example beam dump.
Figure 5B:
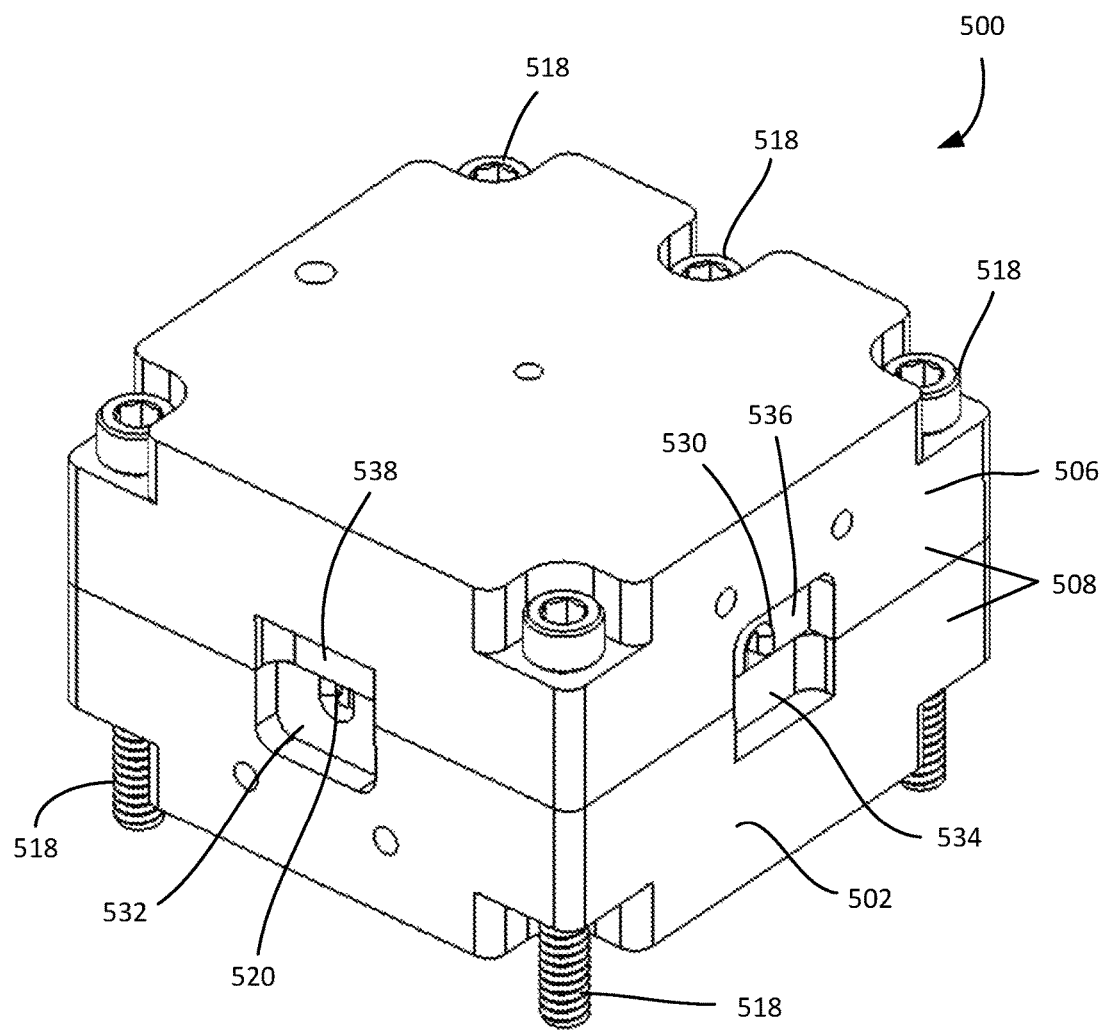
FIG. 5B is a perspective view of the first half of the example beam dump shown in FIG. 5A along with a second half of the example beam dump.

FIGS. 5A-5B show an example of a beam dump 500 that includes a first half portion 502 having an interior face 504 and a second half portion 506 that can have the same or substantially the same or identical shape as the first half portion 502. As seen in FIG. 5B, the second half portion 506 is flipped and rotated by 90° with respect to the first half portion 502 so that the interior face 504 of the first half portion 502 comes in contact with a corresponding an interior face (not shown) of the second half portion 506. The first and second half portions 502, 506 are made of a thermally conductive material, such as aluminum or copper, so as to form a thermally conductive block 508. Each half portion 502, 506 includes an interior volume 510 that is defined by one or more curved surfaces 512. In representative examples, surfaces of the interior volume 510 are nickel-coated to enhance optical absorption. In some examples, the interior volume 510 has a hemispherical shape, and in some examples, the interior volume 510 can be defined by one or more planar surfaces 514. One or more holes 516 can be bored through the interior face 504 and fasteners 518 inserted through the holes 516 to provide an mechanism for aligning and securing the first and second half portions 502, 506.

The first half portion 502 includes a notch 520 forming an inlet in which an optical fiber 522 is secured. The optical fiber 522 includes an end portion 524 with a polymer buffer removed so as to expose a cladding surface 526. A cleaved end 528 of the optical fiber 522 is positioned in the interior volume 510 and a portion of the end portion 524 of the optical fiber 522 is secured in the notch 520 with a low index polymer suitably lower than the cladding surface 526 so as to guide light that propagates through the optical fiber 522 and end portion 524 to emit from the cleaved end 528. The low index polymer can also cause buffer-guided light to become directed into the interior volume 510. In some examples, the cleaved end 528 is cleaved at a non-perpendicular angle with respect to a longitudinal axis of the optical fiber 522. In further examples, the cleaved end 528 includes a coated fiber endcap. In representative examples, the cleaved end 528 is coated with an anti-reflection coating. The second half portion 506 includes a notch 530 that is situated at a different position from the notch 520 with the first and second half portions 502, 506 secured to each other. The notch 530 provides an optical path for diffuse light in the interior volume 510 to propagate to a photodetector (not shown) situated in or coupled to the notch 530.

The first half portion 502 also includes a first receiving portion 532 adjacent to the notch 520 and a second receiving portion 534 spaced apart from the first receiving portion 532 and in alignment with the notch 530 of the second half portion 506 that is in contact with the first half portion 502. The second half portion 506 includes similar first and second receiving portions 536, 538 that align with the respective second and first receiving portions 534, 532 of the first half portion 502. The receiving portions 532, 534, 536, 538 can have various configurations, including being recessed into or extending outwardly from the conductive block 508. In some examples, the receiving portions 532, 534, 536, 538 can be shaped to receive attaching hardware associated with the notches 520, 530, such as optical fiber connectors or photodetector mating points or conforming shapes. With identical first and second half portions 502, 506, the part count of the beam dump 500 is reduced, and the frequency of operator error during manufacture and assembly is decreased. In some examples, substantially identical half portions can have minor variations from each other, for example, with respect to machining tolerances. In other examples, substantially identical half portions can include designed differences but the substantially identical characteristics provide simplicity of assembly or interchangeability between inlets and outlets. As shown, the notches 520, 530 are centrally positioned relative to an exterior of the respective first and second half portions 502, 506, but non-central positions can be formed as well, so that the notches 520, 530 are spaced apart from other including without relative rotation of the first and second half portions 502, 506 as secured to each other.

Figure 6:
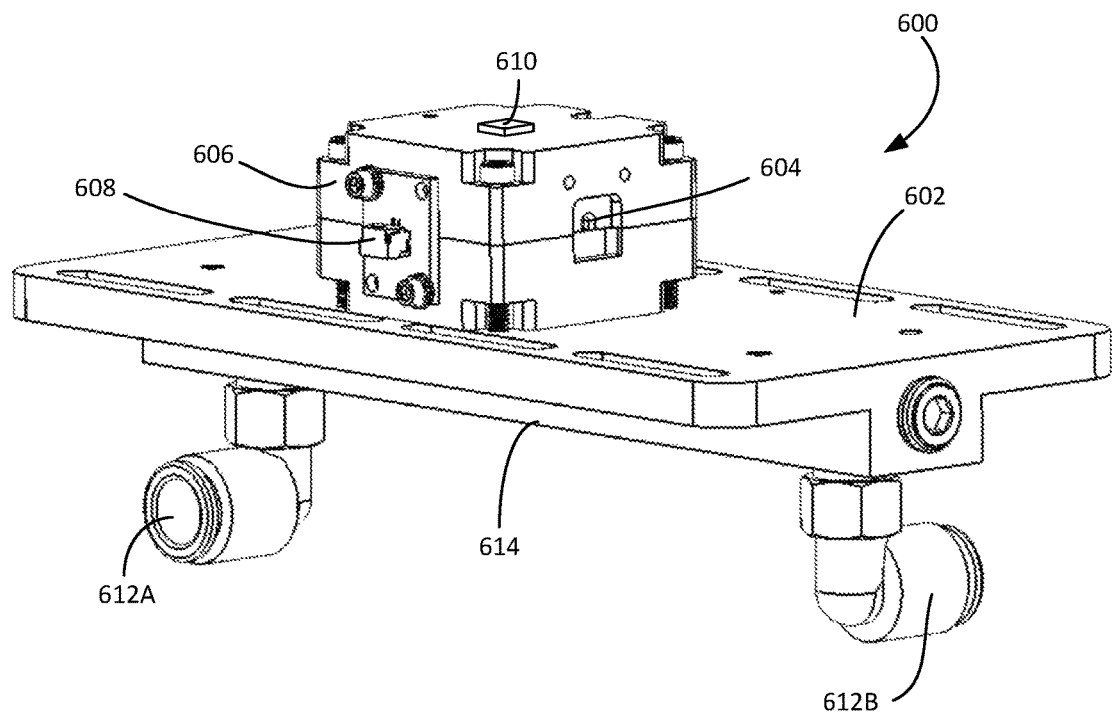
FIG. 6 is a perspective view of an example of an actively cooled beam dump.

FIG. 6 shows an example of a beam dump 600 coupled to a cooling block 602. The beam dump 600 is situated to receive an end of an optical fiber (not shown) in a notch 604 and to multiply reflect and diffuse light emitted from the optical fiber in an interior volume of the beam dump 600. The beam dump 600 includes a thermally conductive housing 606 situated to absorb thermal energy associated with the diffused light. A photodetector 608 is coupled to the interior volume of the beam dump 600 so as to detect the power level or wavelength of the diffused light. A thermistor 610 is coupled to a surface of the thermally conductive housing 606 and is situated to detect a temperature of the thermally conductive housing 606. As the power level of the light emitted from the optical fiber increases, the thermistor 610 can detect a corresponding temperature change. Cooling block input and output ports 612A, 612B are situated between opposite ends of a cooling block channel 614. Coolant (such as water) flowing through the cooling block channel 614 of the cooling block 602 can reduce the temperature of the conductive housing based on the detected temperature or power levels. In some examples, peltier coolers may be used.

Figure 7:
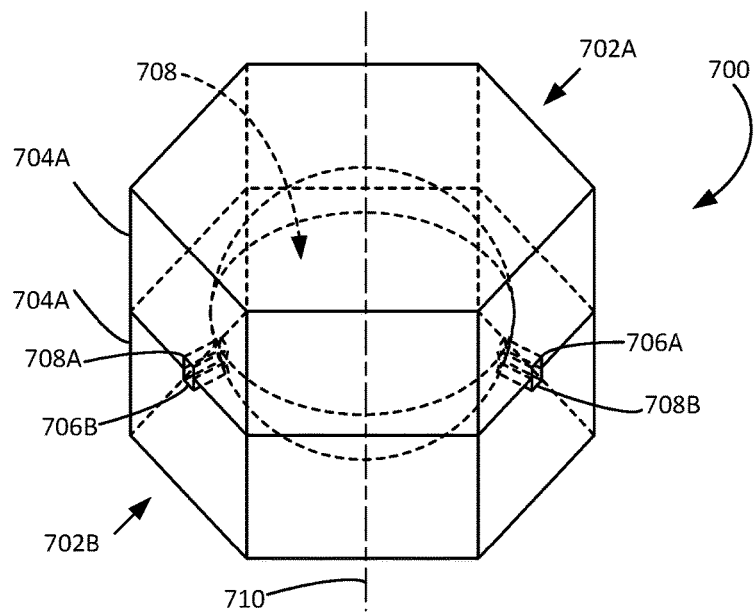
FIG. 7 is a perspective view of an example of an integrating beam dump.

FIG. 7 shows an example of an integrating beam dump 700 that includes two substantially identical halves 702a, 702b having a hexagonal shape on an exterior surface 704a, 704b. With the halves 702 facing each other and rotated about an axis 710, corresponding notches 706a, 708b and notches 706b, 708a align to form a pair of inlets forming a communication path into a spherical interior volume 708 defined by the facing halves 702. The interior volume 708. In some examples, holes can be used instead of notches including a single hole from one of the exterior surfaces 704 so that two holes are formed with the halves 702 facing each other. Communication paths into the interior volume 708 can be situated at angles other than perpendicular to the axis 710 and can be directed into the interior volume 708 along axes other than intersecting the axis 710. The spherical shape of the interior volume 708 can produce an integrating effect that multiply reflects light coupled into the interior volume 708 to scatter and diffuse the light for improved detection and absorption. A surface of the interior volume 708 can be specularly or diffusely reflective (e.g., Lambertian, semi-Lambertian, etc.).

Figure 8:
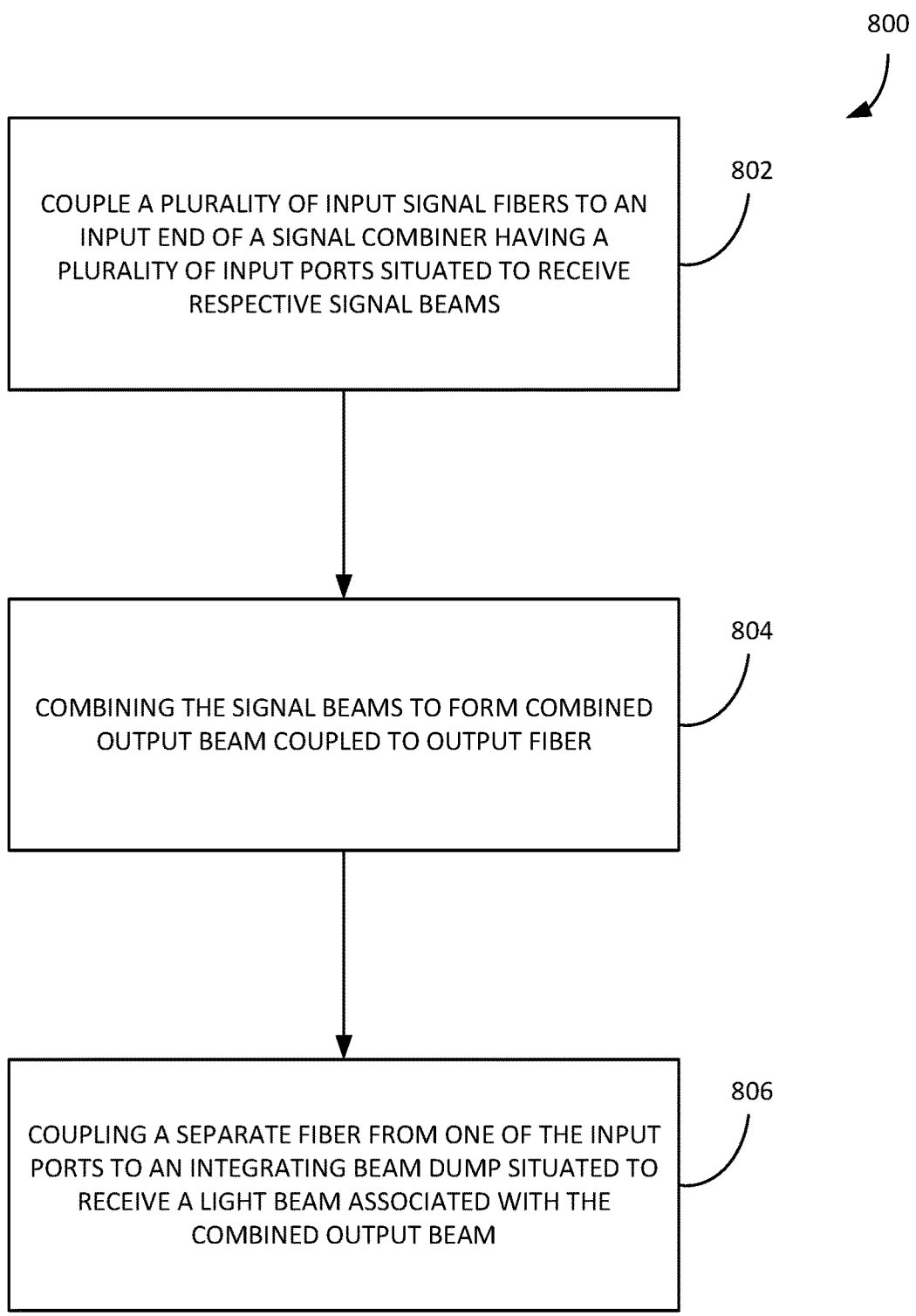
FIG. 8 is a flowchart of an example method of combining high power signal beams.

FIG. 8 shows an example method 800 of forming a robust high power laser system. The example method 800 includes, at 802, coupling a plurality of input signal fibers to an input end of a signal combiner having a plurality of input ports situated to receive respective signal beams. At 804, the signal combiner combines the signal beams to form a combined output beam that is coupled to a combined output fiber at an output end of the signal combiner. At 806, an output end of a separate fiber coupled to one of the input ports of the signal combiner is coupled to an integrating beam dump situated to receive a light beam associated with the combined output beam.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope and spirit of the appended claims.

We claim:

1. An apparatus, comprising:
   a plurality of input fibers including one or more signal fibers and one or more beam dump fibers;
   a signal combiner having an input end coupled to the plurality of input fibers so as to couple portions of one or more signal beams respectively propagating in one or more of the signal fibers to form a combiner beam;

an output fiber coupled to an output end of the signal combiner so as to receive the combiner beam; and a beam dump coupled to at least one of the one or more beam dump fibers so as to receive a light beam propagating from the output fiber that is associated with the combiner beam, wherein the beam dump comprises a conductive housing having cavity walls that define an interior volume, and the one or more beam dump fibers are coupled to the beam dump so that the light beam propagating from the output fiber and associated with the combiner beam is directed to the cavity walls that define the interior volume.

2. The apparatus of claim 1, wherein the signal beams are continuous wave laser beams having a power of 1 kW or greater.

3. The apparatus of claim 1, wherein the plurality of input fibers is three input fibers coupled to the signal combiner input end.

4. The apparatus of claim 1, wherein the plurality of input fibers is seven input fibers coupled to the signal combiner input end.

5. The apparatus of claim 4, wherein at least two of the seven input fibers include input ends that are coupled to each other.

6. The apparatus of claim 4, wherein the one of the one or more beam dump fibers is coupled to a central position or side position on the signal combiner input end.

7. The apparatus of claim 1, wherein the light beam associated with the combiner beam includes one or more of stimulated Raman scattering light, feedback light at a wavelength of the combiner beam, or light coupled into an output end of the output fiber.

8. The apparatus of claim 7, wherein the light beam received by the beam dump has a power of 50 W or greater.

9. The apparatus of claim 7, further comprising a delivery fiber coupled to the output end of the output fiber.

10. The apparatus of claim 1, wherein the beam dump housing includes a pair of substantially identical thermally conductive halves having respective interior faces angularly rotated relative to each other and joined so as to define the interior volume, each half including a curved interior surface situated to diffuse light propagating in the interior volume and a notch input situated to receive one of an output end of the at least one of the one or more beam dump fibers and a photodetector.

11. The apparatus of claim 10, wherein the photodetector and the at least one of the one or more beam dump fibers are situated with respect to each other at a non-zero angle.

12. The apparatus of claim 11, wherein the photodetector is situated to receive at least a portion of the diffused light propagating in the interior volume that corresponds to the light beam received from the output end of the at least one of the one or more beam dump fibers.

13. The apparatus of claim 12, wherein an exposed cladding surface and a fiber jacketing surface of the output end of the at least one of the one or more beam dump fibers is secured in the notch input of one of the thermally conductive halves with a low index polymer.

14. The apparatus of claim 10, wherein the cavity walls of the interior volume of the beam dump are situated to absorb the diffused light in the interior volume corresponding to the light beam.

15. The apparatus of claim 14, wherein the beam dump includes a water-cooled absorber coupled to at least a portion of one or both of the thermally conductive halves so as to direct the heat associated with the absorbed diffused light away from the beam dump.

16. The apparatus of claim 10, wherein the output end of the at least one of the one or more beam dump fibers includes a fiber tip that extends into the interior volume.

17. The apparatus of claim 1, wherein the signal combiner is a glass fused and tapered signal combiner.

18. The apparatus of claim 1, wherein the one or more beam dump fibers are removable from the beam dump so as to receive a signal beam that is combined with the signal combiner to form the combiner beam.

19. The apparatus of claim 1, further comprising:
one or more signal sources situated to produce the one or more signal beams, each signal source including a plurality of pump sources coupled to one or more fiber laser oscillators or fiber laser master oscillator power amplifiers.

20. The apparatus of claim 1, wherein the cavity walls of the interior volume are nickel-plated.

21. A method, comprising:
coupling a plurality of input signal fibers to an input end of a signal combiner having a plurality of input ports situated to receive respective signal beams and to combine the signal beams to form a combiner output beam coupled to an output fiber coupled to an output end of the signal combiner; and
coupling an output end of a separate fiber coupled to one of the input ports of the signal combiner to a beam dump situated to receive a light beam associated with the combiner output beam directed to the cavity walls of a beam dump, the beam dump including a conductive housing in which an interior volume is defined.

22. The method of claim 21, wherein each input signal fiber is coupled to a fiber laser oscillator or a fiber master oscillator power amplifier, with each fiber laser oscillator or a fiber master oscillator power amplifier coupled to one or more pump sources.

23. The method of claim 22, wherein the beam dump is situated to remove at least a portion of the light beam by absorbing the optical energy of the portion, wherein the beam dump housing is thermally conductive.

24. The method of claim 23, wherein the beam dump is situated to monitor a characteristic of the light beam that is associated with the combiner output beam so that the signal beams can be deenergized in response to the monitored characteristic to reduce a probability of failure of one or more of the signal combiner, pump sources, or fiber laser oscillators or fiber master oscillator power amplifiers.

25. The method of claim 24, wherein the beam dump includes a pair of substantially identical thermally conductive housing halves having respective interior faces angularly rotated relative to each other and joined so as to define the interior volume, each housing half including a curved interior surface situated to diffuse light propagating in the interior volume and a notch situated to receive one of the output end of the separate fiber directing the light beam into the interior volume or a photodetector situated to receive the diffused light so as to monitor the characteristic of the light beam.

26. The method of claim 25, wherein the beam dump includes a water-cooled absorber coupled to at least a portion of one or both of the thermally conductive halves so as to direct the heat associated with the absorbed diffused light away from the beam dump.

27. The method of claim 21, wherein the light beam associated with the combiner output beam includes SRS light, feedback light at a wavelength of the combiner output beam, or light coupled into an output end of the output fiber.

28. An apparatus, comprising:
a pair of substantially identical thermally conductive housing halves having respective interior faces angularly rotated relative to each other and joined so as to define an interior volume, each housing half including a curved interior surface situated to diffuse light propagating in the interior volume and a notch input extending from an exterior surface of the housing half to the interior volume so that the notch of one thermally conductive housing half is situated to receive an optical input and the notch of the other thermally conductive housing half is situated to be coupled to a photodetector.

29. The apparatus of claim 28, wherein each housing half includes a first receiving portion coupled to the notch and a second receiving portion situated at a non-zero angle with respect to the notch.

30. The apparatus of claim 28, wherein the first receiving portion of the one thermally conductive housing half is aligned with the second receiving portion of the other thermally conductive housing half and the second receiving portion of the one thermally conductive housing half is aligned with the first receiving portion of the other thermally conductive housing half.

31. The apparatus of claim 28, wherein the interior faces are planar and the interior volume includes a pair of opposed planar surfaces parallel to the interior faces.

32. An apparatus, comprising:
a first beam dump housing half including an interior situated to dump light, and including an inlet extending from an exterior surface of the beam dump housing half to the interior to either receive the light or to direct the received light to a photodetector, wherein the first beam dump housing half is situated to receive a substantially identical second beam housing dump half so that an inlet of the second beam dump housing half is situated so as to oppositely either direct the received light to a photodetector or to receive the light.

33. The apparatus of claim 32, wherein the second beam dump housing half is secured to the first beam dump housing half.

34. The apparatus of claim 33, wherein the second beam dump housing half is rotated relative to the first beam dump housing half.

* * * * *